(12) United States Patent
Jiang

(10) Patent No.: US 8,750,946 B2
(45) Date of Patent: Jun. 10, 2014

(54) SIDE GROUNDED STRUCTURE FOR COMBINED BATTERY LID OF MOBILE COMMUNICATION TERMINAL

(75) Inventor: Tao Jiang, Shenzhen (CN)

(73) Assignee: TCL Tian Yi Mobile Communications (Shenzhen) Company Limited, Shenzhen (CN)

( * ) Notice: Subject to any disclaimer, the term of this patent is extended or adjusted under 35 U.S.C. 154(b) by 459 days.

(21) Appl. No.: 12/678,726

(22) PCT Filed: Apr. 3, 2009

(86) PCT No.: PCT/CN2009/071151
§ 371 (c)(1),
(2), (4) Date: Mar. 17, 2010

(87) PCT Pub. No.: WO2009/124486
PCT Pub. Date: Oct. 15, 2009

(65) Prior Publication Data
US 2010/0273537 A1    Oct. 28, 2010

(30) Foreign Application Priority Data
Apr. 7, 2008  (CN) .......................... 2008 1 0066478

(51) Int. Cl.
*H04M 1/00*    (2006.01)
(52) U.S. Cl.
USPC ...................................... 455/575.1
(58) Field of Classification Search
USPC ................ 455/424, 425, 456.6, 550.1, 575.1, 455/63.1, 334, 278.1, 300, 301, 575.8; 361/760, 761, 800; 343/702, 718, 841, 343/851
See application file for complete search history.

(56) References Cited

U.S. PATENT DOCUMENTS

| | | | | |
|---|---|---|---|---|
| 4,712,898 A | * | 12/1987 | Haraguchi | 396/539 |
| 5,456,027 A | * | 10/1995 | Tecchio et al. | 36/134 |
| 5,673,181 A | * | 9/1997 | Hsu | 361/760 |
| 6,028,555 A | * | 2/2000 | Harano | 343/702 |
| 6,232,659 B1 | * | 5/2001 | Clayton | 257/724 |
| 6,305,814 B1 | * | 10/2001 | Giamas | 362/100 |

(Continued)

FOREIGN PATENT DOCUMENTS

CN          101110849 B      1/2008

OTHER PUBLICATIONS

SIPO Office Action dated Feb. 23, 2011.

*Primary Examiner* — Yuwen Pan
*Assistant Examiner* — Ankur Jain
(74) *Attorney, Agent, or Firm* — Shimokaji & Associates P.C.

(57) ABSTRACT

A side grounded structure for combined battery lid of mobile communication terminal is provided, which comprises a metallic battery lid, and there is a plastic layer set in the metallic battery lid, and a spring contact slice is set between the metallic battery lid and the plastic layer, the spring contact slice is connected to the metallic battery lid and has a curve contact section used to connect the grounded down-lead of the circuit board. By adopting the combined structure of battery lid and equipping the spring contact slice in the battery lid, the side grounded structure for combined battery lid of mobile communication terminal in present invention conveniently realizes the ground contact, assures the efficiency of the contact, enables the convenient production, improves the product yield and reduces consumption and cost in manufacture.

5 Claims, 6 Drawing Sheets

(56) References Cited

U.S. PATENT DOCUMENTS

| | | |
|---|---|---|
| 6,930,891 B1 * | 8/2005 | Hama et al. ............... 361/800 |
| 7,004,595 B1 * | 2/2006 | Stoddard .................... 362/95 |
| 7,801,577 B2 * | 9/2010 | Lee ........................ 455/575.1 |
| 7,912,520 B2 * | 3/2011 | Choi et al. ............... 455/575.1 |
| 2003/0224837 A1 * | 12/2003 | Kuriyama et al. ......... 455/575.1 |
| 2004/0204188 A1 * | 10/2004 | Stevens .................. 455/575.1 |
| 2007/0252767 A1 * | 11/2007 | Chiba et al. ............... 343/702 |
| 2009/0315789 A1 * | 12/2009 | Sung et al. ................ 343/702 |

* cited by examiner

SIDE GROUNDED STRUCTURE FOR COMBINED BATTERY LID OF MOBILE COMMUNICATION TERMINAL

TECHNICAL FIELD

The present invention relates to the structure of a component of a mobile communications terminal. In particular, it relates to an improvement of a side grounded structure of the battery lid of a mobile communications terminal.

BACKGROUND TECHNOLOGY

In the existing technology, the realization of the major functions of a mobile terminal need the radio frequency of an antenna for signal linking and transmission. Therefore, it is necessary to guarantee good quality of antenna performance. At the same time, in current mobile terminals such as cell phones, due to quality requirements, more and more cell phones use metallic battery lids such as those of stainless steel.

Since the edge of a stainless steel battery lid is quite narrow, in ordinary circumstances, it is very difficult to achieve side grounding. But if no side grounding is done, it will have the following impact: since a metallic part with a large area will have a direct and serious impact on the RF performance of the antenna, a direct consequence is that the antenna performance will be unstable, with poor speech quality.

Therefore, the existing technology uses a local 90 degree curve to increase grounding area. As shown in FIG. 1a, FIG. 1b and FIG. 1c, on the edge of the stainless steel battery lid 110, there is a 90 degree curve grounding part 111. But the existing technology also suffers from several defects:

First, the curve grounding part 111 has a relatively small area and is integral to the stainless steel battery lid 110, so it is prone to poor contact and can thus hardly meet the grounding requirements.

Next, the grounding part 111 of the 90 degree curve must at the same time guarantee a smooth side, in order to meet the electric requirements of grounding contact. Thus, the product defect rate is quite high.

Third, the cost of the mold used to perform such curving is rather high, with a complex production process. Also, it is prone to high wear and tear.

Therefore, the existing technology suffers from defects and needs to be improved and developed.

SUMMARY OF THE INVENTION

The purpose of the present invention is to provide a side grounded structure for a combined battery lid of mobile communication terminal, to improve the structure of the battery lid, improve the product yield, lower the production cost and facilitate production.

The technical solution of the present invention includes:

A side grounded structure for a combined battery lid of mobile communication terminal comprises a metallic battery lid having a plastic layer set in the metallic battery lid. An elastic contact sheet is set between the aforementioned metallic battery lid and the aforementioned plastic layer. The contact sheet is electrically connected to the metallic battery lid and has a curved contact section used to connect the grounded down-lead of the circuit board.

The aforementioned side grounded structure for a combined battery lid includes an elastic contact sheet placed on the main enclosure corresponding to the aforementioned curved contact. The elastic curve on one end of it is used to connect to the contact of the aforementioned curve; the other end is used to connect to the grounded down-lead of the aforementioned circuit board.

The aforementioned side grounded structure for combined battery lid includes the aforementioned metallic battery lid made of stainless steel.

The aforementioned side grounded structure for a combined battery lid includes an elastic curve between the aforementioned metallic battery lid and the aforementioned plastic layer of the aforementioned elastic contact sheet, for use in contacting and connecting the aforementioned metallic battery lid.

A side grounded structure for a combined battery lid of a mobile communications terminal provided by the present invention includes a structure for a combined battery lid and an elastic contact sheet assembled in the battery lid which make it easy to achieve grounding contact and ensure the effectiveness of such contact, facilitates production, improves product yield and reduces the consumption and cost in production.

SPECIFIC EMBODIMENTS

In light of the drawings, the following is a more detailed description of the preferred embodiments of the present invention.

Figure 1A:
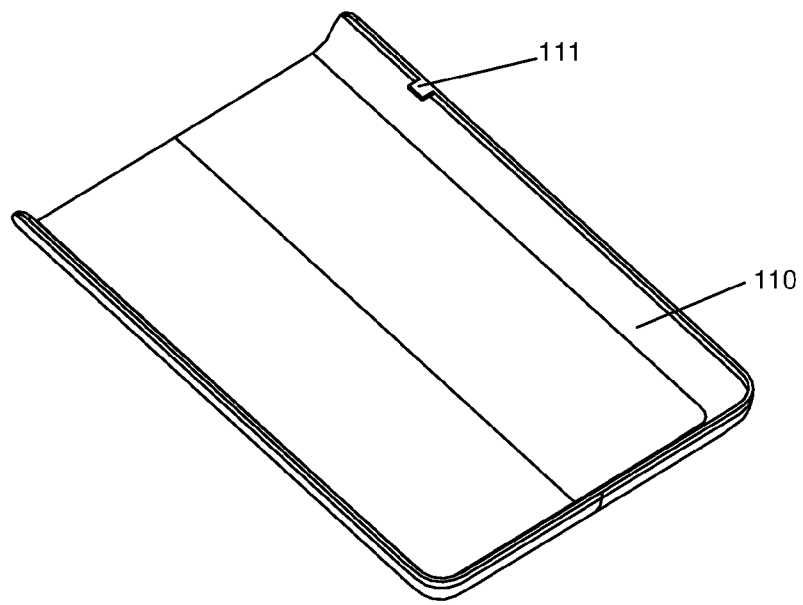
FIG. 1a is a schematic of a battery lid in the existing technology.
Figure 1B:
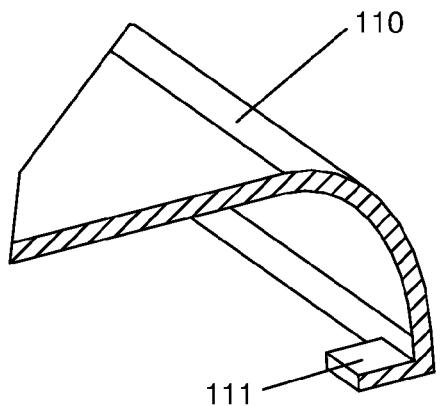
FIG. 1b and FIG. 1c are respectively a cross sectional view and an enlarged view of the side grounded structure for a combined battery lid in the existing technology.
Figure 1C:
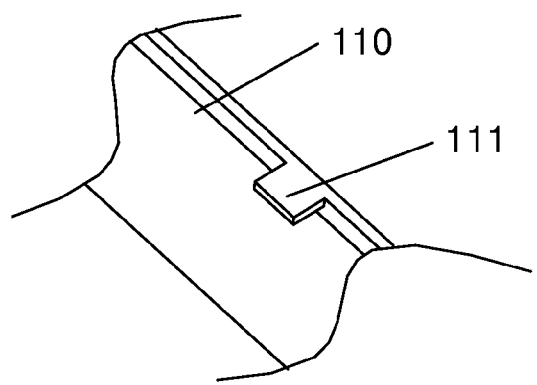
Figure 2:
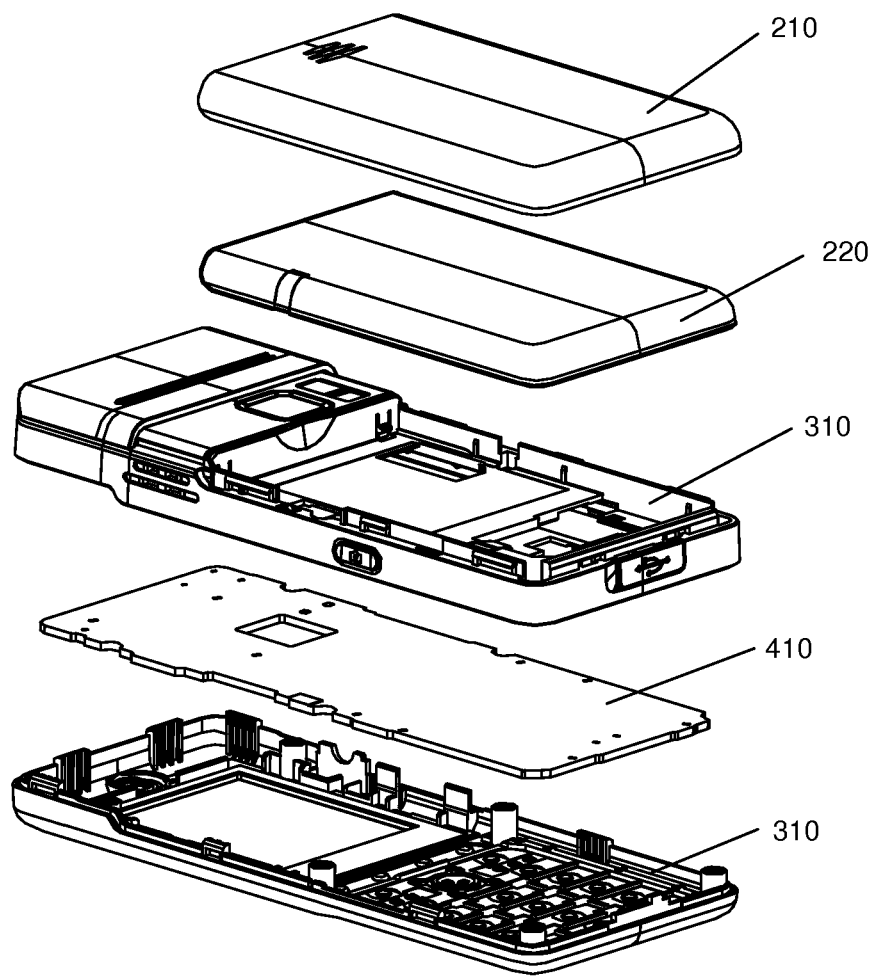
FIG. 2 is a disassembled view of the side grounded structure for a combined battery lid in the present invention.

As shown in FIG. 2, the side grounded structure for a combined battery lid for a mobile communications terminal in the present invention addresses the issue of the difficulty of side grounding for an ordinary stainless steel battery lid of a mobile communications terminal. The invention improves the side grounded structure of a combination and such a structure has the following advantages:

1. It achieves good side grounding performance of a stainless steel battery lid, thus guaranteeing the RF performance of a cell phone;

2. The grounding contact of the product facilitates the achievement of good quality, avoiding product defects in the production process, improving the product yield, simplifying the production process, lowering the cost of material consumption for parts and the cost of the production process.

Figure 3A:
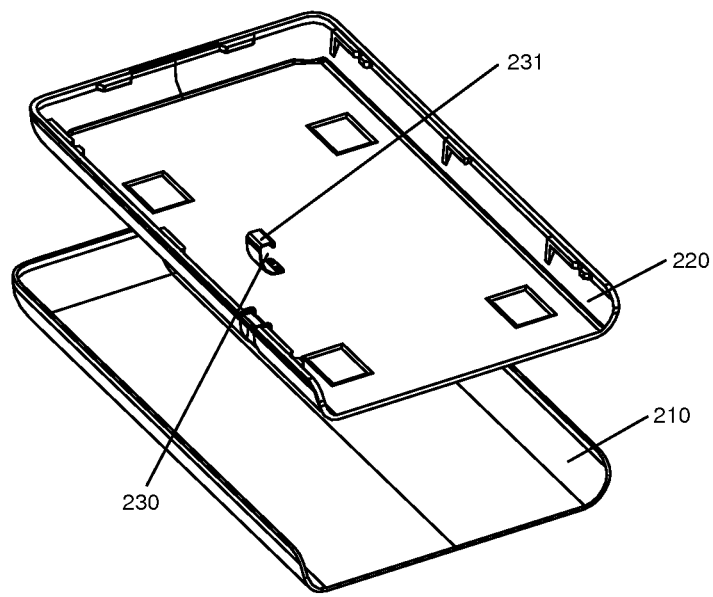
FIG. 3a, FIG. 3b and FIG. 3c are respectively a disassembled, cross sectional view of the side grounded structure for a combined battery lid in the present invention.
Figure 3B:
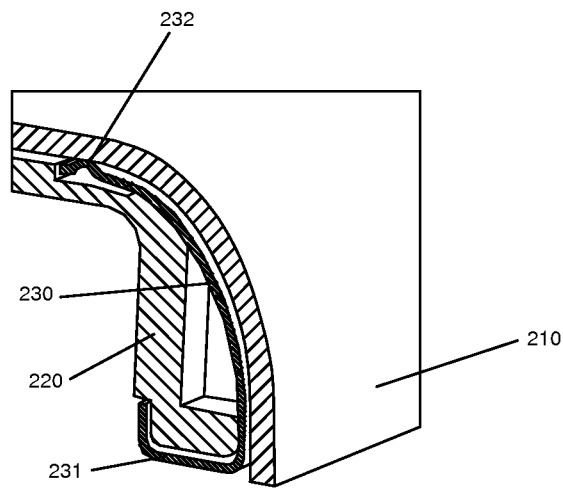
Figure 3C:
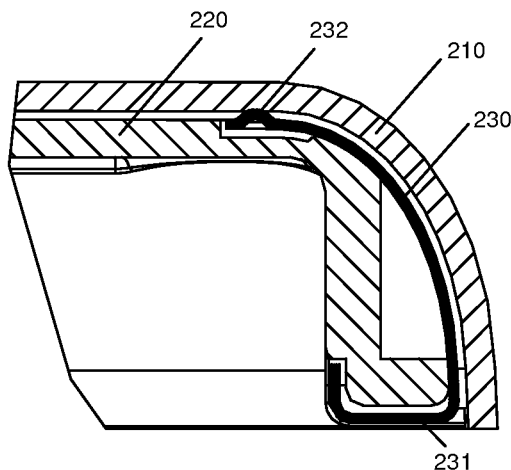

As shown in FIG. 2, the aforementioned grounded structure for a combined battery lid of a mobile communications terminal in the present invention comprises a stainless steel battery lid 210. No 90 degree curving is required to achieve grounding. On the inner side of the aforementioned stainless steel battery lid 210 is a plastic layer 220 that achieves fitting and connection with the aforementioned stainless steel battery lid 210 through a fastening structure; between the aforementioned stainless steel battery lid 210 and the aforementioned plastic layer 220 is an elastic contact sheet 230. It is curved. Its inner side extends according to the degree of curve of the aforementioned stainless steel battery lid 210 and the aforementioned plastic layer 220. Its outer side curves inward and partially wraps up the aforementioned plastic layer 220 to form contact 231, as shown in FIG. 3*a*, FIG. 3*b* and FIG. 3*c*. An elastic curve 232 is also placed on the inner side of the aforementioned elastic contact sheet 230, to ensure contact and connection to the aforementioned stainless steel battery lid 210 in order to achieve conducting connection.

The side grounded structure for a combined battery lid forms a battery lid by combining the aforementioned stainless steel battery lid 210, plastic layer 220 and the aforementioned elastic contact sheet 230. Its structure is easier to assemble through combinations, thus lowering the product defect rate, simplifying production and facilitating assembly. Therefore, the production cost is reduced.

Figure 4A:
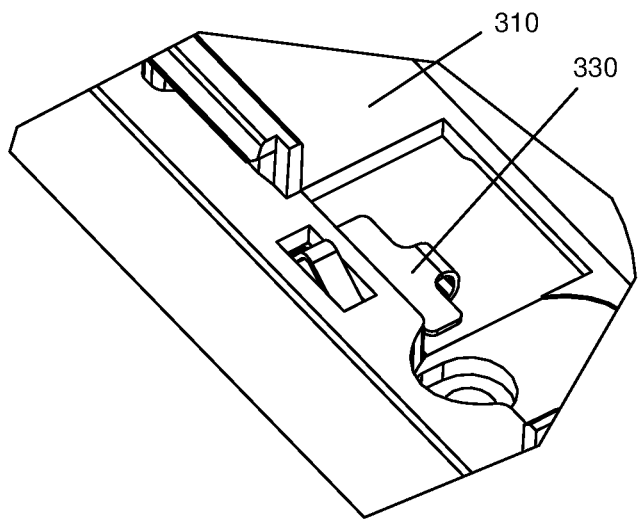
FIG. 4a and FIG. 4b are schematics of the front side and back side of the structure of the main enclosure corresponding to the battery lid in the present invention.
Figure 4B:
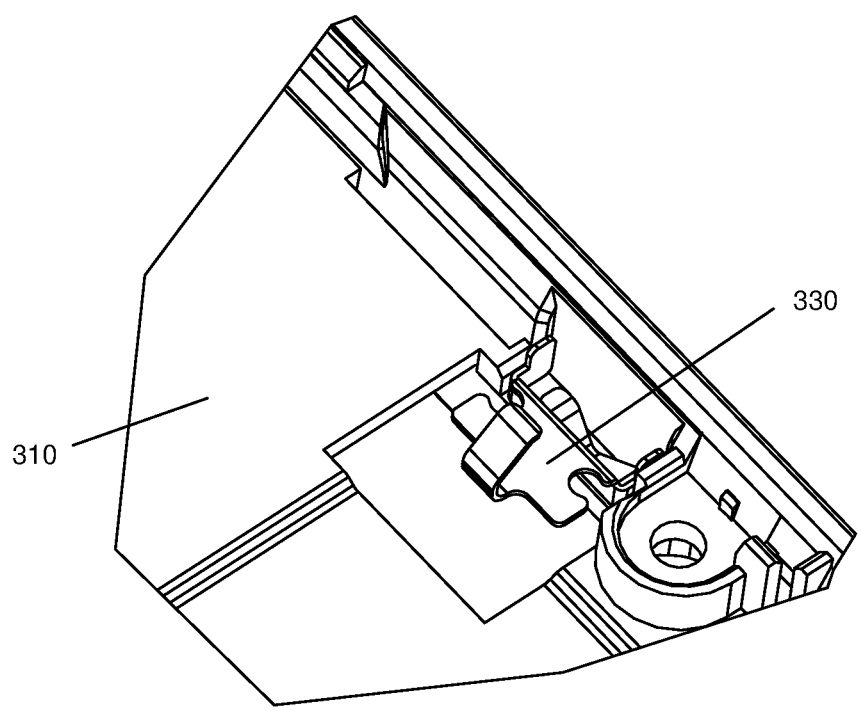
Figure 5:
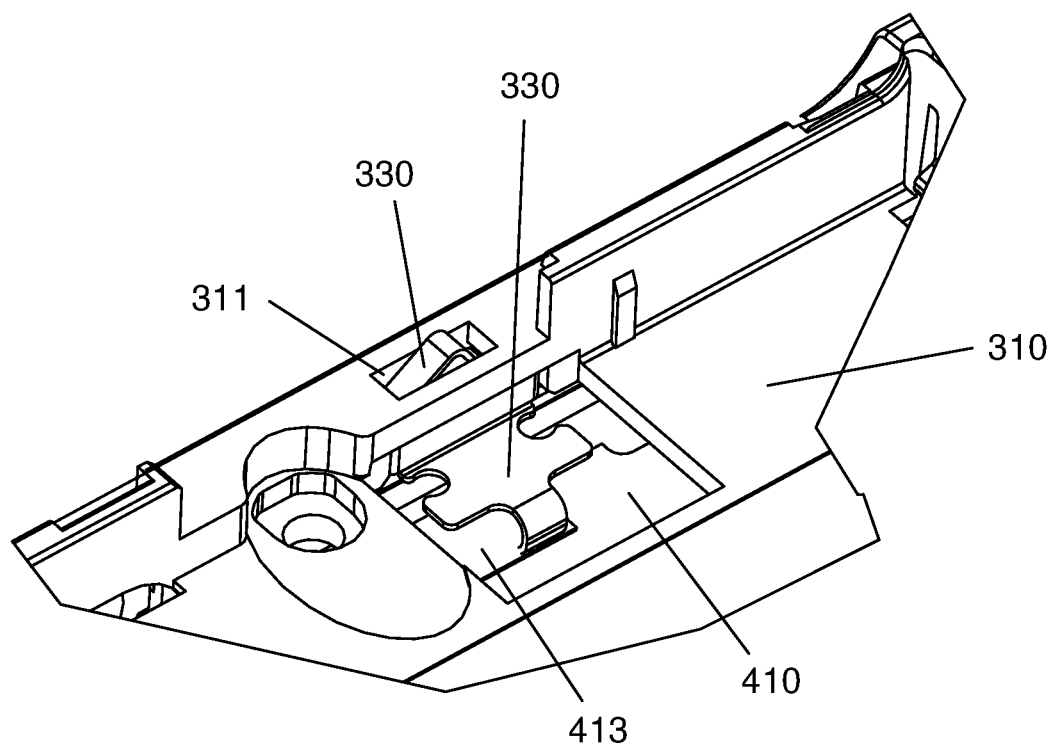
FIG. 5 is a schematic of the down-lead of a PCB connected to the main enclosure corresponding to the side grounded structure for a combined battery lid in the present invention.

The side grounded structure for a combined battery lid for mobile communications terminal described by the present invention also improves the main body enclosure of the aforementioned mobile communications terminal cell phone. As shown in FIG. 4*a* and FIG. 4*b*, to support the side grounded structure for a combined battery lid in the present invention, a conducting contact sheet 330 is placed on the aforementioned main body bottom enclosure 310. The conducting contact sheet 330 is also a curved structure, whose bottom surface is an elastic curve, to guarantee that it properly and electrically contacts and connects to the grounded down-lead 413 of the circuit board PCB 410, as shown in FIG. 4*a* and FIG. 4*b*; the other end of the aforementioned conducting contact sheet 330 is also an elastic curve and is placed in a hole 311 of the battery side of the aforementioned main body bottom enclosure 310. The hole 311 is placed on the side of the battery and corresponds to the position of contact 231 of the aforementioned stainless steel battery lid 210, for contact and connection to said contact 231.

Thus, the aforementioned side grounded structure for a combined battery lid in the present invention can, through the aforementioned conducting contact sheet 330 and the elastic contact sheet 230, connect to the aforementioned stainless steel battery lid 210 and the down-lead of the circuit board PCB 410, achieving good grounding performance of the aforementioned stainless steel battery lid, thus guaranteeing the RF performance of the cell phone antenna module; the grounding contact of the product further facilitates good quality of the cell phone antenna, thus avoiding product defects during the production process and improving the product yield.

It should be understood that the description of the above preferred embodiments of the present invention is rather specific and should be deemed as a limitation of the scope of protection of the present invention. The scope of the patent protection of the present invention shall be subject to the claims attached.

The invention claimed is:

1. A side grounded structure for a combined battery lid for a mobile communications terminal, comprising:
    a metallic battery lid having a plastic layer, the metallic battery lid and the plastic layer having similar shape and size;
    an elastic contact sheet set between the metallic battery lid and the plastic layer, said elastic contact sheet being electrically connected to the metallic battery lid and having an elastic curvature configured to connect to a grounded down-lead of a circuit board,
    wherein the elastic contact sheet has an inner side and an outer side with the inner side extending with a similar curvature as the metallic battery lid and the plastic layer,
    wherein the elastic contact sheet has a humped area in contact with the metallic battery lid,
    wherein the outer side of the elastic contact sheet curves inward and extends from one side of the plastic layer to another side of the plastic layer, and
    wherein the elastic contact sheet partially wraps up the plastic layer; and
    an electrically conducting contact sheet on a main enclosure corresponding to the elastic curvature, the elastic curvature being connected to the grounded down-lead of the circuit board, wherein the electrically conducting contact sheet extends through a hole in a battery side of the main enclosure,
    wherein the elastic curvature of the elastic contact sheet between the metallic battery lid and the plastic layer is configured to ground the metallic battery lid.

2. The side grounded structure for a combined battery lid for a mobile communications terminal according to claim 1, wherein the metallic battery lid is a stainless steel battery lid.

3. A side grounded structure for a combined battery lid for a mobile communications terminal, comprising:
    a metallic battery lid having a plastic layer;
    an elastic contact sheet set between the metallic battery lid and the plastic layer, said elastic contact sheet being electrically connected to the metallic battery lid and having an elastic curvature configured to connect to a grounded down-lead of a circuit board,
    wherein the elastic contact sheet has an inner side and an outer side with the inner side extending with a similar curvature as the metallic battery lid and the plastic layer,
    wherein the outer side of the elastic contact sheet extends underneath the plastic layer from one side of the plastic layer to another side of the plastic layer, and
    wherein the elastic contact sheet partially wraps up the plastic layer; and
    an electrically conducting contact sheet on a main enclosure corresponding to the elastic curvature, the elastic curvature being connected to the grounded down-lead of the circuit board, wherein a folded member of the electrically conducting contact sheet extends through a hole in a battery side of the main enclosure,
    wherein the elastic curvature of the elastic contact sheet between the metallic battery lid and the plastic layer is configured to ground the metallic battery lid.

4. The side grounded structure for a combined battery lid for a mobile communications terminal according to claim 3, wherein the metallic battery lid is a stainless steel battery lid.

5. The side grounded structure for a combined battery lid for a mobile communications terminal according to claim 3, wherein the elastic curvature between the metallic battery lid and the plastic layer of the elastic contact sheet is for use in grounding the metallic battery lid.

* * * * *